(12) United States Patent
Krishnamurthy et al.

(10) Patent No.: US 10,628,548 B2
(45) Date of Patent: Apr. 21, 2020

(54) FLOW CONTROL IN NETWORKING SYSTEM-ON-CHIP VERIFICATION

(71) Applicant: Mentor Graphics Corporation, Wilsonville, OR (US)

(72) Inventors: Suresh Krishnamurthy, Noida (IN); Deepak Kumar Garg, Noida (IN); Ankit Garg, Noida (IN); Saurabh Khaitan, Noida (IN); Sanjay Gupta, Noida (IN); John R. Stickley, Lake Oswego, OR (US); Russell Elias Vreeland, III, Seal Beach, CA (US); Ronald James Squiers, Castro Valley, CA (US)

(73) Assignee: Mentor Graphics Corporation, Wilsonville, OR (US)

( * ) Notice: Subject to any disclaimer, the term of this patent is extended or adjusted under 35 U.S.C. 154(b) by 129 days.

(21) Appl. No.: 15/792,078

(22) Filed: Oct. 24, 2017

(65) Prior Publication Data
US 2018/0113976 A1    Apr. 26, 2018

Related U.S. Application Data

(60) Provisional application No. 62/412,803, filed on Oct. 25, 2016.

(51) Int. Cl.
*G06F 17/50*    (2006.01)
*G06F 13/16*    (2006.01)
(Continued)

(52) U.S. Cl.
CPC ........ *G06F 17/5077* (2013.01); *G06F 11/221* (2013.01); *G06F 11/2221* (2013.01);
(Continued)

(58) Field of Classification Search
None
See application file for complete search history.

(56) References Cited

U.S. PATENT DOCUMENTS 7,502,884 B1    3/2009  Shah et al.
9,397,944 B1 *  7/2016  Hobbs ................... H04L 47/00
(Continued)

OTHER PUBLICATIONS

Naruko et al., "FOLCS: A Lightweight Implementation of a Cycle-accurate NoC Simulator on FPGAs", 3rd International Workshop on Many-core Embedded Systems, Jun. 2015. (Year: 2015).*

(Continued)

*Primary Examiner* — Jack Chiang
*Assistant Examiner* — Aric Lin

(57) ABSTRACT

A system for verifying networking system-on-chip designs comprises a reconfigurable hardware modeling device programmed to implement circuitry hardware models and a traffic generation device communicating with the reconfigurable hardware modeling device. The circuitry hardware models comprise a hardware model of a circuit design and a hardware model of interface circuitry. The system employs a backpressure flow control independent of the communication protocol, which can cause the traffic generation device to suspend sending messages when one or more message buffers in the traffic generation device, the reconfigurable hardware modeling device, or both cannot accept more messages based on predetermined conditions.

11 Claims, 5 Drawing Sheets

Verification system 300

(51) Int. Cl.
  *G06F 11/22* (2006.01)
  *G06F 11/273* (2006.01)
  *G06F 11/26* (2006.01)

(52) U.S. Cl.
  CPC ........ *G06F 11/2289* (2013.01); *G06F 11/261* (2013.01); *G06F 11/2733* (2013.01); *G06F 13/1673* (2013.01); *G06F 17/504* (2013.01); *G06F 17/5027* (2013.01); *G06F 17/5031* (2013.01); *G06F 17/5054* (2013.01); *G06F 17/5068* (2013.01); *G06F 17/5081* (2013.01)

(56) References Cited

U.S. PATENT DOCUMENTS

| | | | |
|---|---|---|---|
| 2004/0111248 A1 | 6/2004 | Granny et al. | |
| 2005/0022143 A1* | 1/2005 | Butts ................... | G06F 17/5022 716/102 |
| 2005/0175341 A1 | 8/2005 | Ovadia | |
| 2011/0072151 A1 | 3/2011 | Sharma et al. | |
| 2015/0073609 A1 | 3/2015 | Forbes, Jr. | |
| 2015/0188847 A1 | 7/2015 | Chopra et al. | |
| 2015/0215177 A1 | 7/2015 | Pietrowicz et al. | |
| 2016/0234119 A1 | 8/2016 | Zaidi et al. | |
| 2017/0193136 A1 | 7/2017 | Prasad et al. | |
| 2018/0113970 A1 | 4/2018 | Suresh et al. | |
| 2018/0113972 A1 | 4/2018 | Suresh et al. | |
| 2018/0113976 A1 | 4/2018 | Suresh et al. | |
| 2018/0300440 A1 | 10/2018 | Ali et al. | |

OTHER PUBLICATIONS

Chen et al., "Pipelined NoC router architecture design with buffer configuration exploration on FPGA", 25th International Conference on Field Programmable Logic and Applications, Sep. 2015. (Year: 2015).*

* cited by examiner

FLOW CONTROL IN NETWORKING SYSTEM-ON-CHIP VERIFICATION

RELATED APPLICATIONS

This application claims the benefit of U.S. Provisional Patent Application No. 62/412,803, filed on Oct. 25, 2016, and naming Krishnamurthy Suresh et al. as inventors, which application is incorporated entirely herein by reference.

FIELD OF THE DISCLOSED TECHNOLOGY

The present disclosed technology relates to the field of circuit design verification technology. Various implementations of the disclosed technology may be particularly useful for verifying networking system-on-chip circuit designs.

BACKGROUND OF THE DISCLOSED TECHNOLOGY

Modern integrated circuit designs have become extremely complex. As a result, various techniques have been developed to verify that circuit designs will operate as desired before they are implemented in an expensive manufacturing process. For example, logic simulation is a tool used for verifying the logical correctness of a hardware design. Designing hardware today involves writing a program in the hardware description language. A simulation may be performed by running that program. If the program runs correctly, then one can be reasonably assured that the logic of the design is correct at least for the cases tested in the simulation.

Software-based simulation, however, may be too slow for large complex designs such as SoC (System-on-Chip) designs. The speed of execution of a simulator drops significantly as the design size increases due to cache misses and memory swapping. Emulation and prototyping significantly increase verification productivity by employing reconfigurable hardware modeling devices including emulators and prototyping devices. Field programmable gate arrays (FPGAs)-based emulators and prototyping devices rely on an actual silicon implementation and perform circuit verification generally in parallel as the circuit design will execute in a real device. By contrast, a simulator performs circuit verification by executing the hardware description code serially. The different styles of execution can lead to orders of magnitude differences in execution time.

While reconfigurable hardware modeling device-based emulation and prototyping are much faster than simulation for system-on-chip designs, verifying circuit designs for networking applications at the system level remains a challenge. These designs can reach billion-gate sizes and are complex in various dimensions, imposing a variety of requirements on the verification environment.

A network switch, for example, receives traffic from its ingress pin interfaces and after some traffic arbitration, flow control and routing, sends it out through its egress pin interfaces. These ingress and egress pin interfaces are also known as ports. The port interfaces follow the network protocol in both directions. Hence the verification components that drive traffic into the ports and receive traffic from the ports have to be protocol compliant. A modern-day Ethernet switch can have a large number of such ingress/ egress ports (e.g., from 64 to 256). The number is expected to grow up to 1024 in the coming future. All port configurations need to be tested; and the performance and bandwidth of the network switch design need to be checked and measured.

A verification system typically includes a reconfigurable hardware modeling device programmed to implement at least a hardware model of the networking circuit design under test, a traffic generation device configurable to generate traffic mimicking the complexities of real life networking traffic, and a traffic analysis device configurable to qualify and measure a variety of different parameters important for the verification. The traffic generation device may be able to create multiple streams of traffic and then combine them in a desired proportion or scheme to be sent to a given port on the switch design. The packets in a stream may be given different priorities as per the protocol.

The traffic generation device and the traffic analysis device may be implemented by a complex software tool running on a computer. This complex software tool can generate message packets at a speed much faster than the speed at which the hardware model implemented on a reconfigurable hardware modeling device can process message packets. This is at least in part because the traffic generation is a software algorithm operating at a high level of abstraction whereas the hardware model runs the switch design at a low, RTL level of abstraction. Buffering up packets of data on the path can alleviate effects of the speed mismatch. The buffer size has practical limitations, and the protocol flow control also has limitations, it is thus desirable to develop a protocol-independent flow-control mechanism to regulate data packet generation and delivery.

BRIEF SUMMARY OF THE DISCLOSED TECHNOLOGY

Aspects of the disclosed technology relate to flow control techniques for verifying networking system-on-chip designs. There is a system comprising: a reconfigurable hardware modeling device programmed to implement circuitry hardware models, the circuitry hardware models comprising: a hardware model of a circuit design and a hardware model of interface circuitry that converts ingress transaction-level messages to ingress signal-level messages for the hardware model of the circuit design and converts egress signal-level messages dispatched from the hardware model of the circuit design to egress transaction-level messages, wherein the transmitting of the ingress signal-level messages and the egress signal-level messages by the hardware model of the circuit design conforms to a communication protocol; and a traffic generation device communicating with the reconfigurable hardware modeling device, the traffic generation device being configured to generate and send the ingress transaction-level messages and to receive and analyze the egress transaction-level messages, wherein the reconfigurable hardware modeling device and the traffic generation device employ a backpressure flow control independent of the communication protocol, the backpressure flow control causing the traffic generation device to suspend sending messages when one or more message buffers in the traffic generation device, the reconfigurable hardware modeling device, or both cannot accept more messages based on predetermined conditions.

The reconfigurable hardware modeling device may be a hardware emulator or an FPGA-based prototyping device. The traffic generation device may be implemented at least in part by a network traffic tool, and the network traffic tool may be implemented by a virtual machine running on a computer. The traffic generation device may comprise a virtual interface and an interface software model. Here, the virtual interface is an interface between the virtual machine and a host program running on the computer, and the interface software model is coupled to the hardware model of interface circuitry through one or more physical communication channels. The one or more physical communication channels may be optimized for transmitting a large number of small-sized data packets.

The circuit design under test may have one or more ports for sending and/or receiving message packets. The circuit design may be a design for a network switch, a router, a network processor, or a network gateway.

The backpressure flow control may comprise checking status of one or more of the one or more message buffers by the traffic generation device before sending a message. Alternatively, the backpressure flow control may comprise sending a message to the message generation unit.

Certain inventive aspects are set out in the accompanying independent and dependent claims. Features from the dependent claims may be combined with features of the independent claims and with features of other dependent claims as appropriate and not merely as explicitly set out in the claims.

Certain objects and advantages of various inventive aspects have been described herein above. Of course, it is to be understood that not necessarily all such objects or advantages may be achieved in accordance with any particular embodiment of the disclosed technology. Thus, for example, those skilled in the art will recognize that the disclosed technology may be embodied or carried out in a manner that achieves or optimizes one advantage or group of advantages as taught herein without necessarily achieving other objects or advantages as may be taught or suggested herein.

DETAILED DESCRIPTION OF THE DISCLOSED TECHNOLOGY

General Considerations

Figure 1A:
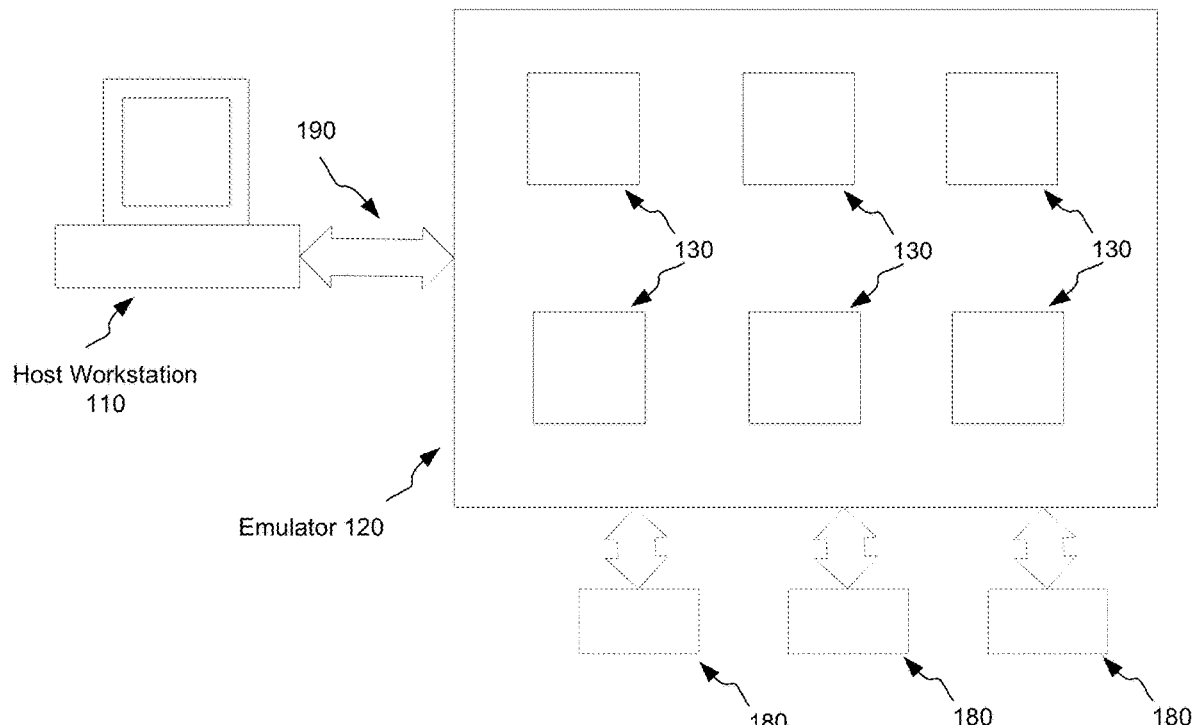
FIG. 1A shows an illustrative example of an emulation system with an emulator being coupled to targets.

Various aspects of the present disclosed technology relate to flow control techniques for verifying networking system-on-chip designs. In the following description, numerous details are set forth for the purpose of explanation. However, one of ordinary skill in the art will realize that the disclosed technology may be practiced without the use of these specific details. In other instances, well-known features have not been described in detail to avoid obscuring the present disclosed technology.

Although the operations of the disclosed methods are described in a particular sequential order for convenient presentation, it should be understood that this manner of description encompasses rearrangements, unless a particular ordering is required by specific language set forth below. For example, operations described sequentially may in some cases be rearranged or performed concurrently. Moreover, for the sake of simplicity, the disclosed flow charts and block diagrams typically do not show the various ways in which particular methods can be used in conjunction with other methods.

Illustrative Hardware Modeling Environment

Reconfigurable hardware modeling devices can be emulators or prototyping devices. Two types of emulators have been developed. The first type is FPGA-based. In an FPGA-based architecture, each FPGA chip has a network of prewired blocks of look-up tables and coupled flip-flops. A look-up table can be programmed to be a Boolean function, and each of the look-up tables can be programmed to connect or bypass the associated flip-flop(s). Look-up tables with connected flip-flops act as finite-state machines, while look-up tables with bypassed flip-flops operate as combinational logic. The look-up tables can be programmed to mimic any combinational logic of a predetermined number of inputs and outputs. To emulate a circuit design, the circuit design is first compiled and mapped to an array of interconnected FPGA chips. The compiler usually needs to partition the circuit design into pieces (sub-circuits) such that each fits into an FPGA chip. The sub-circuits are then synthesized into the look-up tables (that is, generating the contents in the look-up tables such that the look-up tables together produce the function of the sub-circuits). Subsequently, place and route are performed on the FPGA chips in a way that preserves the connectivity in the original circuit design.

The programmable logic chips employed by an emulator may be commercial FPGA chips or custom-designed emulation chips containing programmable logic blocks. A custom FPGA-based emulator can have a specially designed internal interconnection network of programmable elements within each custom FPGA, an external interconnecting network and I/O structure of custom FPGAs, and a design-under-test debug engine. Such architecture enables, compared to a commercial FPGA-based counterpart, fast and correct-by-construction compilation and high design visibility in the silicon fabric that assumes 100% access without probe compilation and rapid waveform tracing. A commercial FPGA chip may have somewhat larger capacity density than a custom FPGA chip. For a given design, a custom FPGA-based emulator may need more FPGAs than a commercial FPGA-based emulator, leading to larger physical dimensions and higher power consumption.

The second type of emulators is processor-based: an array of Boolean processors able to share data with one another is employed to map a circuit design, and Boolean operations are scheduled and performed accordingly. Similar to the FPGA-based, the circuit design needs to be partitioned into sub-circuits first so that the code for each sub-circuit fits the instruction memory of a processor. The compilation speed of a processor-based emulator, however, is much faster than those of a FPGA-based emulator. Drawbacks are limited speed of execution in a transaction-based mode, large power consumption, and large physical dimensions compared to a FPGA-based emulator.

An emulator may operate in various modes. In an in-circuit emulation mode, the emulator is connected with a user's target system to form a prototype of the system the user is designing. The emulator typically replaces the circuit being designed for the target system, allowing system-level and software testing prior to silicon availability. Although an emulator may run up to six orders of magnitude faster than a simulator, it is often not fast enough to run at the same speed of the physical target system (a few megahertz vs hundreds of megahertz). Speed rate adapters may be introduced between the target system and the emulator. A rate adapter behaves like a buffer. It caches the signal activity from the design-under-test (DUT) at emulation speed and sends it at real-time speed to the target system. Conversely, it captures the signal activity from the target system at full speed, caches it, and then sends it back to the DUT at emulation speed. Even when a rate adapter is available, the constant evolution of speed and complexity of individual I/O protocols may make timely rate adapter development difficult.

In an acceleration mode, the physical target system is replaced by a virtual target system modelled via one of the high-level languages such as SystemVerilog, SystemC, or C++. The acceleration mode leverages the existing simulation testbench and removes the need for external rate adapters. The testbench creates test vectors and check corresponding responses of the circuit model. In addition to the elimination of speed adapters, the acceleration mode has advantages such as no hardware dependencies, the ability to use the emulator remotely, and the ability to run verification of corner cases.

The acceleration mode can be cycle-based or transaction-based. The cycle-based acceleration mode employs a signal-level or bit-level interface connecting the testbench processed by the host workstation to the design mode on the emulator. Each and every transition on each and every interface signal must be transferred between the testbench and the design model at the slow speed of the testbench simulated in the workstation. As a result, the speed of the emulator is wasted waiting to carry out these signal transfers.

The transaction-based acceleration reduces the traffic between workstation and emulator by replacing bit-by-bit exchanges with transaction exchanges. Data exchange is through so-called transactors. A transactor, including a front-end proxy interface on the workstation or host computer, a back-end bus-functional model on the emulator and a physical communication channel between the host computer and the emulator, converts high-level commands from the testbench on the host computer into signal-level bit sequences required by the design-under-test model on the emulator, and vice versa. This allows data being streamed and buffered between the testbench and the design-under-test, speeding up the execution of the testbench. A design team can thus access the full performance of the emulator. In addition to performance, the transaction-based emulation eliminates the need for rate adapters. The design-under-test can connect to a "virtual device" (a software model of the device) that runs on the host computer through a transaction-level interface or to a physical device through a transaction-level interface and a "virtual device" acting as a bridging device.

In addition to emulators, reconfigurable hardware modeling devices also include FPGA prototyping devices. FPGA prototyping is typically deployed near the end of the verification process to catch system-level issues. For designs that rely heavily on commercial intellectual property (IP), an FPGA-based prototype is an ideal test platform for ensuring all IP components perform together. An FPGA-based prototype can also serve as a vehicle for software development and validation. Embedded software has become the dominant part of the effort in modern System-on-Chip (SoC) design. FPGA prototyping provides software developers early access to a fully functioning hardware platform well before real silicon. This enables early software development tasks such as operating system (OS) integration and application testing. The increased productivity of software development and validation greatly accelerates a product's time-to-market.

Compared to FPGA-based emulators which typically operate at one to two million cycles per second, FPGA prototypes are designed and built to achieve the highest speed of execution possible, allowing the extension of the speed range into tens of megahertz. The downside to FPGA prototyping is capacity limitations, limited debugging capabilities and long bring-up time. With growing complexity of FPGAs and advancement in both emulation and prototyping technologies, the lines between FPGA-based prototyping and emulation are increasingly blurring.

In some embodiments, the disclosed technology may be implemented as part of a hardware emulation environment, such as the one illustrated in FIG. 1A. As seen in this figure, the hardware emulation environment includes an emulator 120 coupled to a host computer or workstation 110. The workstation 110 may be implemented by one or more computing systems. One computing system may include a single computer or multiple computers (e.g., a master computer and a plurality of slave computers). The workstation provides the capability to load the DUV (design-under-verification, also referred to as DUT—design under test) model into the emulator, controls the execution of the DUT model on the emulator over time, and serves as a debugging interface into the DUV model on the emulator. As discussed previously, the workstation may include the testbench and perhaps other software models in some of the operational modes.

The emulator 120 includes multiple printed circuit boards (emulation circuit boards) 130. These emulation circuit boards 130 are networked (not shown). A circuit design may be partitioned by the workstation 110 and loaded to the emulation circuit boards 130 for emulation.

In the in-circuit emulation mode, one or more targets 180 may be coupled to the emulator 120 as shown in FIG. 1A. In some simple environments, a target may be a piece of test equipment that generates and verifies test data such as a network tester. In other environments, the target can be the actual circuitry with which the DUT model will interact in its final application (e.g., other hardware components of the system for which the DUT model is designed). A target can be either a static target or a dynamic target, depending on whether design clock signals run in the emulator can be suspended or not.

Figure 1B:
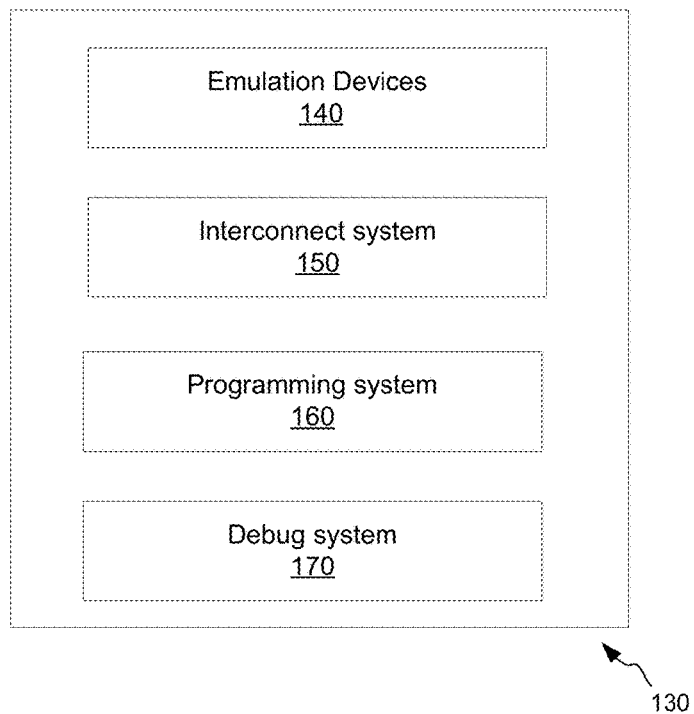
FIG. 1B shows an illustrative example of an emulation circuit board.

FIG. 1B illustrates an example of an emulation circuit board 130. The emulation circuit board 130 includes an array of emulation devices 140. The emulation devices 140 can be programmed to model, for example, combinatorial logic components, sequential circuit components and memories. The emulation devices 140 may be processor-based or FPGA-based.

Also included in the emulation circuit board 130 are a configurable interconnect system 150, a programming system 160, and a debug system 170. A portion of a circuit design on one emulation device may need data computed by another portion of the design on another emulation device. The configurable interconnect system 150 allows data to be moved between emulation devices 140. In some implementations, the configurable interconnect system 150 may include a cross-bar device, a multiplexer, some other configurable network, or any combination thereof.

The programming system 160 enables a variety of other types of data to be brought in or out from an emulation device 140. Examples include programming data to configure an emulation device to perform a particular function, visibility data collected from the debug system 170 to be brought to the host workstation 110 for display, and content data either read from or written to memory circuitry in an emulation device 140.

The debug system 170 enables the emulation system to monitor the behavior of a modeled circuit design. Needed data for visibility viewing purposes can be stored in the debug system 170. The debug system 170 may also provide resources for detecting specific conditions occurring in the circuit design. Such condition detection is sometimes referred to as triggering.

The emulator 120 is coupled to the host workstation 110 through an interface system 190. The interface system 190 comprises one or more interfaces. A typical interface is optimized to transport large amounts of data such as data containing the emulated circuit design model (e.g., FPGA configuration bitstreams), initial contents of registers and design memories and data for debugging purposes. This interface is independent of design-under-test and may comprise dedicated logic or programmed logic in the emulator.

The interface system may also comprise one or more transaction-level interfaces. These interfaces may be optimized for small packets of data and fast streaming speed. The speed may be, for example, in the order of 2-3 Gigabits per second. The communication is performed through transactors as discussed previously. A transactor includes a back-end bus-functional model—instrumented logic in the emulator model, which requires the emulator infrastructure clock keep running even though the design clocks can be stopped.

It should also be appreciated that the emulation system in FIG. 1A and the emulation circuit board 130 in FIG. 1B are illustrated as examples only, and they are not intended to be limiting. Various embodiments of the disclosed technology may be implemented using only a subset of the components illustrated in the figures, or include an alternate combination of components, including components that are not shown in the figures.

Figure 2:
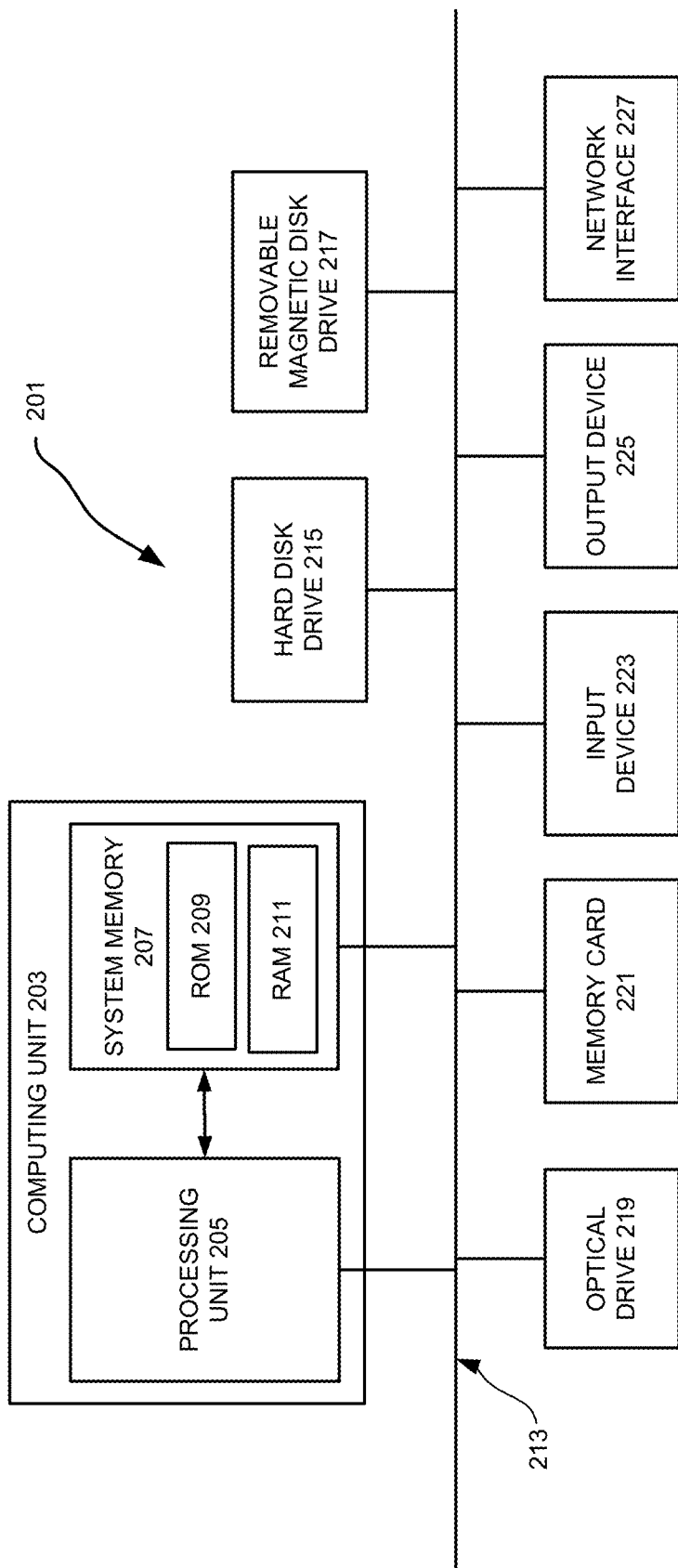
FIG. 2 illustrates a programmable computer system with which various embodiments of the disclosed technology may be employed.

FIG. 2 shows an illustrative example of a computing device 201 that may serve as the workstation 110. As seen in this figure, the computing device 201 includes a computing unit 203 with a processing unit 205 and a system memory 207. The processing unit 205 may be any type of programmable electronic device for executing software instructions, but will conventionally be a microprocessor. The system memory 207 may include both a read-only memory (ROM) 209 and a random access memory (RAM) 211. As will be appreciated by those of ordinary skill in the art, both the read-only memory (ROM) 209 and the random access memory (RAM) 211 may store software instructions for execution by the processing unit 205.

The processing unit 205 and the system memory 207 are connected, either directly or indirectly, through a bus 213 or alternate communication structure, to one or more peripheral devices. For example, the processing unit 205 or the system memory 207 may be directly or indirectly connected to one or more additional memory storage devices, such as a "hard" magnetic disk drive 215, a removable magnetic disk drive 217, an optical disk drive 219, or a flash memory card 221. The processing unit 205 and the system memory 207 also may be directly or indirectly connected to one or more input devices 223 and one or more output devices 225. The input devices 223 may include, for example, a keyboard, a pointing device (such as a mouse, touchpad, stylus, trackball, or joystick), a scanner, a camera, and a microphone. The output devices 225 may include, for example, a monitor display, a printer and speakers. With various examples of the computer 201, one or more of the peripheral devices 215-225 may be internally housed with the computing unit 203. Alternately, one or more of the peripheral devices 215-225 may be external to the housing for the computing unit 103 and connected to the bus 213 through, for example, a Universal Serial Bus (USB) connection.

With some implementations, the computing unit 203 may be directly or indirectly connected to one or more network interfaces 227 for communicating with other devices making up a network. The network interface 227 translates data and control signals from the computing unit 203 into network messages according to one or more communication protocols, such as the transmission control protocol (TCP) and the Internet protocol (IP). Also, the interface 227 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computer 201 is illustrated as an example only, and it not intended to be limiting. Various embodiments of the disclosed technology may be implemented using one or more computing devices that include the components of the computer 201 illustrated in FIG. 2, which include only a subset of the components illustrated in FIG. 2, or which include an alternate combination of components, including components that are not shown in FIG. 2. For example, various embodiments of the disclosed technology may be implemented using a multi-processor computer, a plurality of single and/or multiprocessor computers arranged into a network, or some combination of both.

Back-Pressure Flow Control

Figure 3:
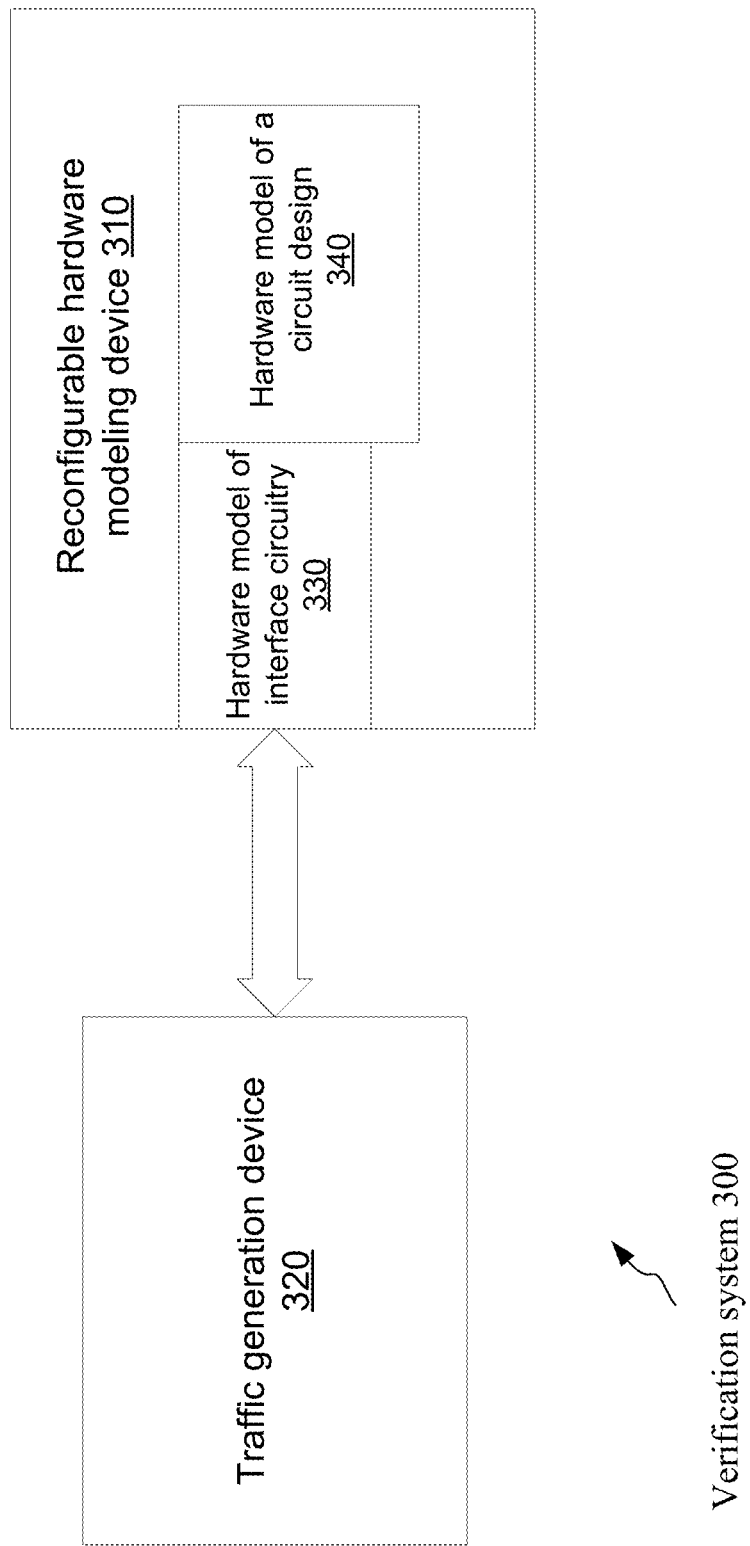
FIG. 3 illustrates an example of a verification system for verifying networking system-on-chip that may be employed by various embodiments of the disclosed technology.

FIG. 3 illustrates an example of a verification system 300 for verifying networking system-on-chip that may be employed by various embodiments of the disclosed technology. The system comprises a reconfigurable hardware modeling device 310 and a traffic generation device 320. The reconfigurable hardware modeling device 310 may be an emulator or an FPGA-based prototyping device. The emulator may be implemented by the emulator shown in FIG. 1A or 1B. The reconfigurable hardware modeling device 310 is programmed to implement circuitry hardware models, which comprises: a hardware model of a circuit design 340 and a hardware model of interface circuitry 330. The circuit design is a networking circuit design such as a design for a network switch, a router, a network processor, or a network gateway. Like a typical networking circuit design, the circuit design may have one or more ports. The verification system 300 can be used for developing and verifying the circuit design, software associated with the circuit design or both.

The hardware model of interface circuitry 330 can convert ingress transaction-level messages to ingress signal-level messages for the hardware model of the circuit design 340 and converts egress signal-level messages dispatched from the hardware model of the circuit design 340 to egress transaction-level messages. The transmitting of the ingress signal-level messages and the egress signal-level messages by the hardware model of the circuit design conforms to a communication protocol. The hardware model of interface circuitry 330 may comprise a back-end bus-functional model and a conditioner. The back-end bus-functional model is part of a transactor while the conditioner is specific to needs of the communication protocol.

The traffic generation device 320 is configured to generate and send the ingress transaction-level messages and to receive and analyze the egress transaction-level messages. The reconfigurable hardware modeling device 310 and the traffic generation device 320 employ a backpressure flow control independent of the communication protocol. The backpressure flow control can cause the traffic generation device to suspend sending messages when one or more message buffers in the traffic generation device, the reconfigurable hardware modeling device, or both cannot accept more messages based on predetermined conditions.

The traffic generation device 320 may be implemented by a network traffic tool installed in a computer system. The software-based tool and the synthesizable hardware models operating in the transaction-based acceleration mode can eliminate some hardware devices otherwise required and, with that, hardware dependencies, including noise, power, cables, reliability and associated costs. The virtual test environment may support multi-users and multi projects, be accessed remotely and deployed in datacenters.

Figure 4:
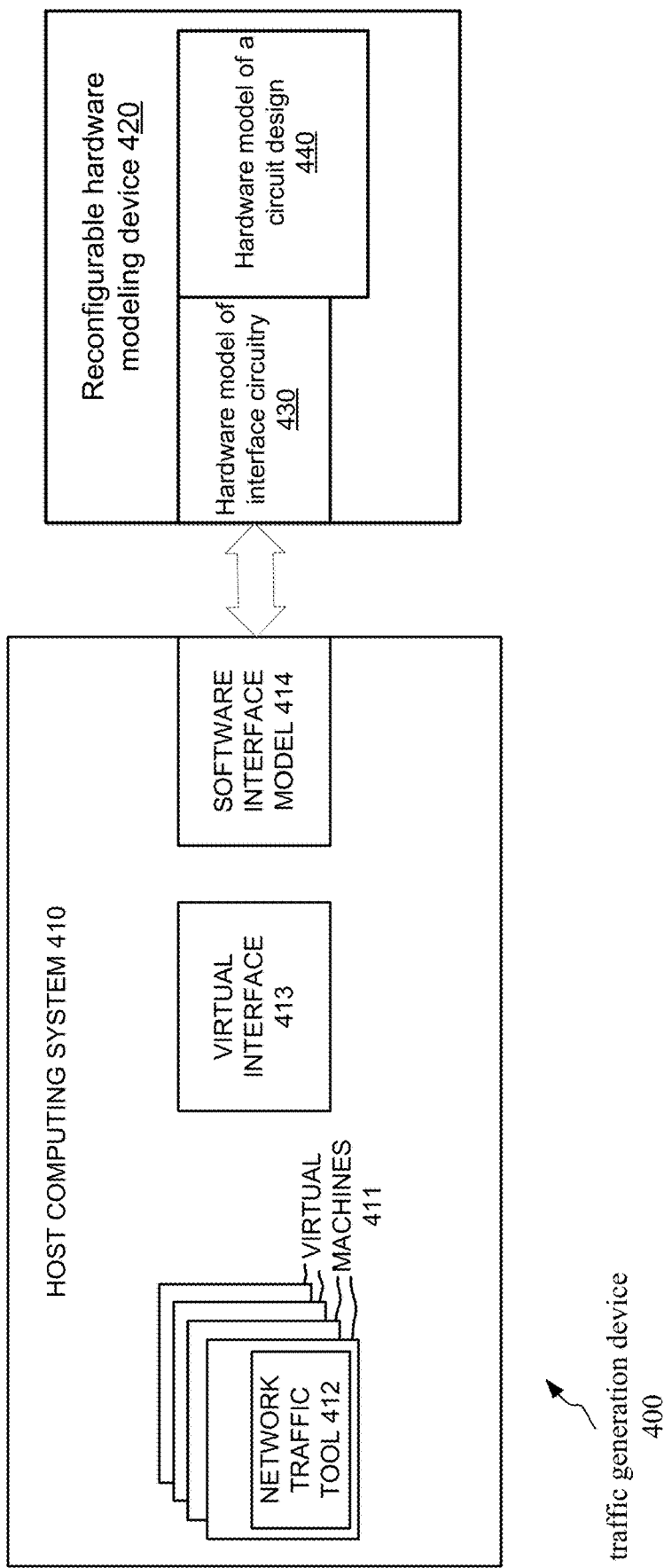
FIG. 4 illustrates an example of a traffic generation device implemented by a network traffic tool installed in a host computer system.

FIG. 4 illustrates an example of a traffic generation device implemented by a network traffic tool 412 installed in a host computer system 410. The host computing system 410 may include one or more computers, workstations, or the like. FIG. 2 shows an example of a computer capable of implementing the host computing system 410.

The host computing system 410 executes one or more virtual machines 411, which can create a virtual environment having virtual electronic hardware and run software on the virtual electronic hardware. The host computing system 410 also includes a hypervisor (not shown in the figure) to configure and control the virtual machines 411 in the host computing system 410. In some embodiments, the virtual machines 411 can include virtual electronic hardware that mimics the hardware architecture of the host computing system 410, for example, allowing the host computing system 410 to run multiple operating systems. The virtual machines 411 may also virtualize hardware architectures that differ from the architecture of the host computing system 410, such as hardware architecture for different computing system, networking device, or the like.

At least one of the virtual machines 411, in some embodiments, implements a network traffic tool 412 to generate one or more of the data packets for testing the circuit design. The network traffic tool 412 can also receive one or more of the data packets. In some embodiments, the virtual machines 411 implementing the network traffic tool 412 can be implemented in a kernel space or a user space to virtualize hardware architecture of a networking device or the like and run software or other machine-executable instructions to implement the network traffic tool 412. The network traffic tool 412 may generate reports indicating, for example, how the circuit design responded to the data packets generated by the network traffic tool 412, abided by one or more communication protocols, or the like.

Although FIG. 4 shows a single network traffic tool 412 implemented in one of the virtual machines 411, in some embodiments, multiple instances of the network traffic tool 412 can be implemented in a common virtual machine, in different virtual machines, or the like. In some embodiments, a plurality of the virtual machines 411 may each include multiple instances of the network traffic tool 412. Each of the instances of the network traffic tool 412 may generate data packets for one of the ports of the circuit design under test.

The virtual machines 411 can exchange data packets with a host program running on the host computing system 410 through a virtual interface 413. The host program can exchange data packets with a hardware model of a circuit design 440 implemented on a reconfigurable hardware modeling device 420 through a software interface model 414 and a hardware model interface circuitry 430. Sometimes the software interface model 414 and the hardware model interface circuitry 430 together or only the latter is referred to as transactor.

To compensate for speed differences mainly between the network traffic tool 412 and the hardware model of the circuit design 440, the virtual interface 413, the software interface model 414 and the hardware model interface circuitry 430 may each have a buffer. Data packets not yet accepted/consumed by a downstream unit can be stored temporarily in a buffer before the downstream unit. Buffer size limitations, however, can still lead to data packets drops. Moreover, other problems can occur if the network traffic tool 412 runs too much ahead of the hardware model of the circuit design 440. The disclosed technology employs a backpressure flow control to solve the problems.

The backpressure flow control can cause the network traffic tool 412 to stop sending out messages (e.g., data packets) based on the buffer status. For example, whenever the buffer in the hardware model interface circuitry 430 (buffer one) is half empty, messages stored in the buffer in the software interface model 414 (buffer two) will be read and loaded in the buffer one. In the same time, the buffer two is being filled with messages read from the buffer in the virtual interface 413 (buffer three). As soon as it is filled up, the buffer one stops receiving messages from the buffer two until the buffer one becomes half empty. Similarly, as soon as it is filled up, the buffer two stops receiving messages from the buffer three until the buffer two becomes half empty. Based on the status of the buffer three, the network traffic tool 412 may stall generating and sending out messages.

With some implementations of the disclosed technology, the network traffic tool 412 checks whether the buffer three has enough space for new messages before loading new messages to the buffer three. For example, the status of the buffer three may be indicated by two indexes: avail_index and used_index. The buffer three becomes full when the gap between avail_index and used_index is equal to the buffer depth. The network traffic tool 412 may stall transmission of a data packet if the size of the data packet is larger than the storage space available.

Figure 5:
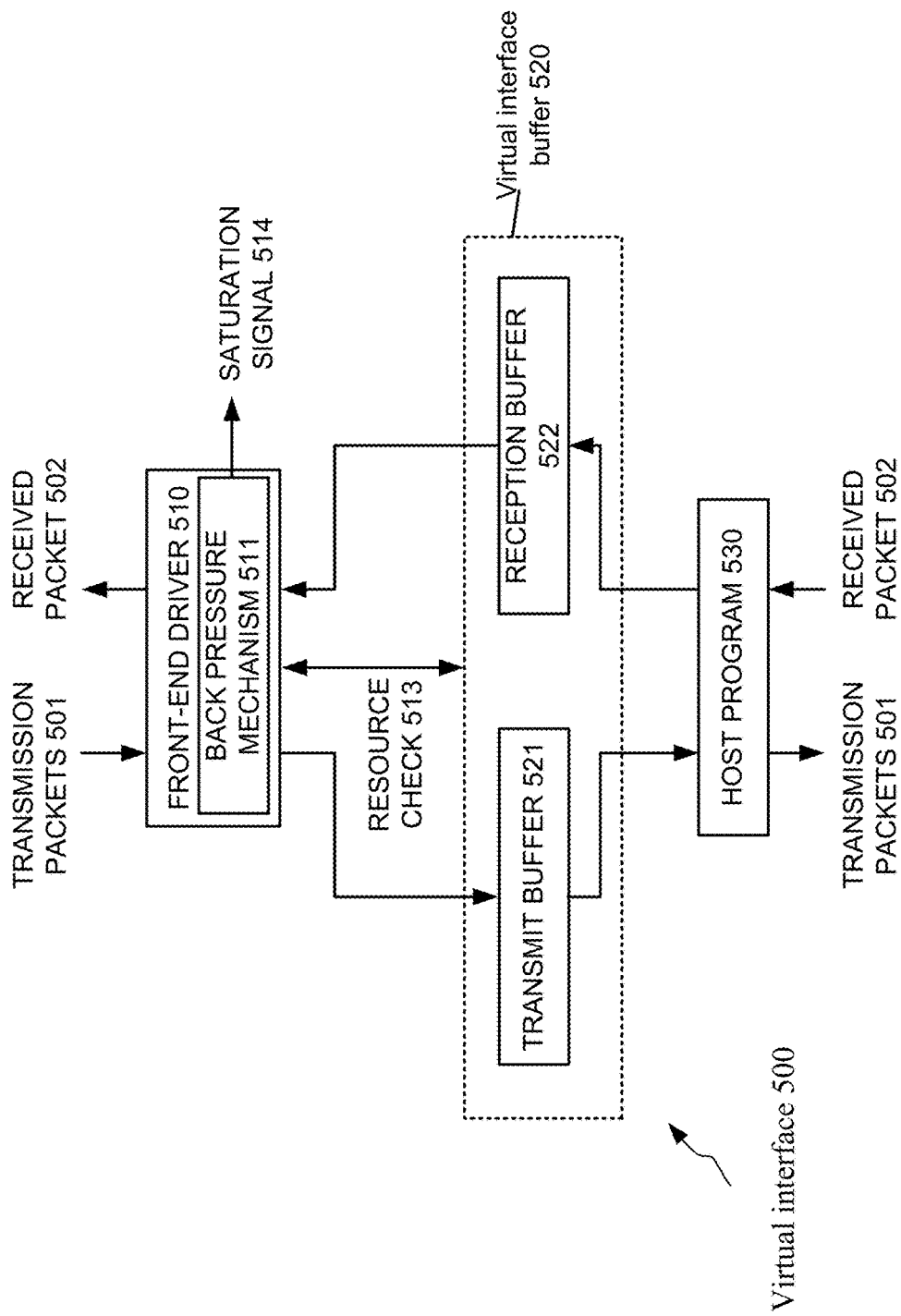
FIG. 5 illustrates an example virtual interface with a back pressure mechanism according to various embodiments of the disclosed technology.

FIG. 5 illustrates an example of a back pressure flow control implemented in the virtual interface 500 according to various embodiments. The virtual interface 500 can include a front-end driver 510 and a virtual buffer 520, which together can provide an interface for exchange of packets between a network traffic tool in a virtual machine and a host program 530 in a host computing system.

During a packet transmission from the virtual machine, the front-end driver 510 can receive transmission packets 501 and store the transmission packets 501 in a transmit buffer 521 of the virtual interface buffer 520. The host program 530 can read the transmission packets 501 from the transmit buffer 521, for example, bypassing the hypervisor of the host computing system. During a packet reception, the host program 530 can store the received packets 502 in a reception buffer 522 of the virtual interface buffer 520, for example, bypassing the hypervisor of the host computing system. The front-end driver 510 can read the received packets 502 from the reception buffer 522 and output the received packets 502 to the virtual machine.

The front-end driver 510 can include a back pressure mechanism 511 to determine an availability of resources in the transmit buffer 521 of the virtual interface buffer 520 to store transmission packets 501. In some embodiments, the back pressure mechanism 511 can perform a resource check 513 on the transmit buffer 521, which can ascertain portions of the transmit buffer 521 having transmission packets 501 already read by the host program 530 and also portions of the transmit buffer 521 having transmission packets 501 awaiting to be read by the host program 530. The back pressure mechanism 511 can perform the resource check 513 in response to receiving a transmission packet 501 from the virtual machine or independently of any receiving a transmission packet 501.

The back pressure mechanism 511 can generate a saturation signal 514 based on the result of the resource check 513. In some examples, the back pressure mechanism 511 can pass along the results of the resource check 513 in the saturation signal, for example, identifying the portions of the transmit buffer 521 having transmission packets 501 already read by the host program 530 and also portions of the transmit buffer 521 having transmission packets 501 awaiting to be read by the host program 530. The back pressure mechanism 511 also can analyze the results of the resource check 513 to determine an available storage space within the transmit buffer 521. The back pressure mechanism 511 can generate the saturation signal 514 to indicate the available storage space within the transmit buffer 521.

Since the front-end driver 510 can control the throughput of the received packets 502 through the receive buffer 522, for example, by controlling a rate the received packets 502 are consumed or read from the receive buffer 522, the host program 530 can determine an available storage space in the reception buffer 522 prior to storing the received packet 502 to the receive buffer 522. The host program 530 can store the receive data packet 502 to the receive buffer 522 when the receive buffer 522 has available space to store the received packet 502. When the determined available space in the receive buffer 522 indicates the receive buffer 522 does not have available space to store the received packet 502, the host program 530 can stall the storage of the received packet 502 until the receive buffer 522 has available space to store the received packet 502.

Alternatively, the backpressure flow control may use a special message to achieve speed matching. In the case of Ethernet, for example, a dedicated Ethernet Type in the range of 0x9003 and 0xFF00 exclusive may contain flow control information. This datagram will have two fields for backpressure "XON" (Transmit ON) and XOFF (Transmit Off). When the buffer in the transactor is about to be full, a message with the XOFF field set is transmitted. The network traffic tool should recognize this message as a special frame from the system and suspend transmission. Once the buffer in the transactor has enough space, another message with the XON field set is transmitted. This frame is an indication to the network traffic tool to resume transmission. Using a dedicated message frame can avoid confusion with IEEE pause/PFC protocols.

CONCLUSION

While the disclosed technology has been described with respect to specific examples including presently preferred modes of carrying out the disclosed technology, those skilled in the art will appreciate that there are numerous variations and permutations of the above described systems and techniques that fall within the spirit and scope of the disclosed technology as set forth in the appended claims. For example, while specific terminology has been employed above to refer to electronic design automation processes, it should be appreciated that various examples of the disclosed technology may be implemented using any desired combination of electronic design automation processes.

What is claimed is:

1. A system, comprising:
a reconfigurable hardware modeling device programmed to implement circuitry hardware models, the circuitry hardware models comprising: a hardware model of a circuit design and a hardware model of interface circuitry that converts ingress transaction-level messages to ingress signal-level messages for the hardware model of the circuit design and converts egress signal-level messages dispatched from the hardware model of the circuit design to egress transaction-level messages, wherein the transmitting of the ingress signal-level messages and the egress signal-level messages by the hardware model of the circuit design conforms to a communication protocol; and
a traffic generation device communicating with the reconfigurable hardware modeling device, the traffic generation device being configured to generate and send the ingress transaction-level messages and to receive and analyze the egress transaction-level messages, wherein the reconfigurable hardware modeling device and the traffic generation device employ a backpressure flow control independent of the communication protocol, the backpressure flow control causing the traffic generation device to suspend sending messages when one or more message buffers in the traffic generation device, the reconfigurable hardware modeling device, or both cannot accept more messages based on predetermined conditions.

2. The system recited in claim 1, wherein the reconfigurable hardware modeling device is a hardware emulator or an FPGA-based prototyping device.

3. The system recited in claim 1, wherein the traffic generation device is implemented at least in part by a network traffic tool, the network traffic tool being implemented by a virtual machine running on a computer.

4. The system recited in claim 3, wherein the traffic generation device comprises a virtual interface and an interface software model, the virtual interface being an interface between the virtual machine and a host program running on the computer, the interface software model being coupled to the hardware model of interface circuitry.

5. The system recited in claim 1, wherein the circuit design has one or more ports for sending and/or receiving message packets.

6. The system recited in claim 1, wherein the circuit design is a design for a network switch, a router, a network processor, or a network gateway.

7. The system recited in claim 1, wherein the backpressure flow control comprises checking status of one or more of the one or more message buffers by the traffic generation device before sending a message.

8. The system recited in claim 1, wherein the backpressure flow control comprises sending a message to the traffic generation device.

9. The system recited in claim 1, wherein the traffic generation device communicates with the reconfigurable hardware modeling device through one or more physical communication channels.

10. The system recited in claim 1, wherein the backpressure flow control comprises sending a dedicated message frame that includes a transmit ON field and a transmit OFF field.

11. The system recited in claim 1, wherein the backpressure flow control comprises generating a saturation signal that identifies portions of a transmit buffer having transmission packets already read by a host program and also identifying portions of the transmit buffer having transmission packets waiting to be read by the host program.

\* \* \* \* \*